United States Patent
Rous

(10) Patent No.: US 8,797,401 B2
(45) Date of Patent: Aug. 5, 2014

(54) CONTROL DEVICE FOR A CAMERA ARRANGEMENT, CAMERA ARRANGEMENT FOR A VEHICLE AND METHOD FOR CONTROLLING A CAMERA IN A VEHICLE

(75) Inventor: Martin Rous, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 13/128,599

(22) PCT Filed: Oct. 14, 2009

(86) PCT No.: PCT/EP2009/063404
§ 371 (c)(1),
(2), (4) Date: Jul. 14, 2011

(87) PCT Pub. No.: WO2010/063509
PCT Pub. Date: Jun. 10, 2010

(65) Prior Publication Data
US 2011/0261212 A1 Oct. 27, 2011

(30) Foreign Application Priority Data
Dec. 3, 2008 (DE) .......................... 10 2008 044 322

(51) Int. Cl.
H04N 7/00 (2011.01)
H04N 7/18 (2006.01)
H04N 5/225 (2006.01)
H04N 5/232 (2006.01)

(52) U.S. Cl.
USPC ................... 348/118; 348/207.11; 348/211.1; 348/211.2; 348/149; 348/153

(58) Field of Classification Search
USPC .............. 348/118, 149, 153, 211.4, 362, 837; 382/104
See application file for complete search history.

(56) References Cited

U.S. PATENT DOCUMENTS

| | | | |
|---|---|---|---|
| 2003/0086000 A1 | 5/2003 | Siemens et al. | |
| 2004/0105027 A1* | 6/2004 | Kawamura et al. | 348/362 |
| 2006/0133688 A1* | 6/2006 | Kang et al. | 382/254 |
| 2007/0285526 A1 | 12/2007 | Mann et al. | |
| 2008/0192132 A1 | 8/2008 | Bechtel et al. | |
| 2009/0160956 A1* | 6/2009 | Yumiki et al. | 348/208.11 |

FOREIGN PATENT DOCUMENTS

| | | |
|---|---|---|
| DE | 698 08 024 | 6/2003 |
| JP | 2002-165138 | 6/2002 |
| WO | WO 00/38949 | 7/2000 |

OTHER PUBLICATIONS

International Search Report for PCT/EP2009/063404, dated Jul. 1, 2010.

* cited by examiner

Primary Examiner — Roberto Velez
Assistant Examiner — Stephen Coleman
(74) Attorney, Agent, or Firm — Kenyon & Kenyon LLP

(57) ABSTRACT

The invention relates to a control device (10) for a camera assemblage (29), the control device (10) comprising: at least one controller (16) for the reception of image signals (11) of a camera (6) and for the output or setting of camera parameters (19, 20) for the camera (6), the image signals (11) comprising a sequence of frames (Fi, i=1, 2,). Provision is made according to the present invention that the control device (10) subdivides the sequence of frames (Fi) into at least two subsequences (12, 14), and the at least one controller (16) controls the subsequences (12, 14) separately, and outputs different camera parameters (19, 20) for controlling the subsequences. Separate controllers or one shared controller are usable in this context. Function modules (22, 23, 24, 25) preferably transmit status signals via interfaces to the at least one controller. The camera assemblage for a vehicle, and a method for controlling the camera, are also provided.

1 Claim, 6 Drawing Sheets

CONTROL DEVICE FOR A CAMERA ARRANGEMENT, CAMERA ARRANGEMENT FOR A VEHICLE AND METHOD FOR CONTROLLING A CAMERA IN A VEHICLE

BACKGROUND OF THE INVENTION

1. Field of the Invention

The present invention relates to a control device for a camera assemblage, to a camera assemblage for a vehicle, and to a method for controlling a camera of a vehicle.

2. Description of Related Art

In video systems of vehicles, the integration time or exposure time of a camera is adapted to the ambient light level. The video system or camera system is equipped for this purpose with a camera controller that, for example by evaluating a histogram or analyzing image data, determines the brightness of the ambient light and deduces from the determined measured values an integration time that ensures a good acquired image. Contrast, average value, moments, and percentiles can serve, for example, as measurement criteria.

In video systems in which a camera is fixedly associated with an application or function, image quality optimization can be directed by the camera controller specifically to the needs of that one application or function. Such applications or functions are, for example, lane detection, road sign detection, light assistant, or trajectory calculation or moving object detection (MOD), pedestrian detector, night vision.

As a result of the introduction of multipurpose camera (MPC) systems, the image signals are being used for multiple functions. As long as the functions or applications make the same or similar demands in terms of image quality, image quality optimization can be carried out directly. It becomes more difficult when different functions make mutually exclusive demands in terms of image quality.

Published German patent application document DE 698 08 024 T2 describes a method and an image acquisition apparatus for generating a video signal having an expanded dynamic range. Such systems are also known as high dynamic range (HDR) images, in which successive images are produced with different parameter settings, in particular with different exposure times, so that an optimized image can subsequently be created from image regions of differing brightness, for example by taking dark regions from the longer-exposure image and brighter regions from the shorter-exposure image. In this case the successive frames of the outputted image signal can be adjusted differently in direct fashion, so that a sequence of different frames is generated. For this, different exposure times are permanently set, and the images are then evaluated.

In Patent Abstracts of Japan JP 2002165138 A, a control device is described which accepts the continuous output of two images having different exposure times.

BRIEF SUMMARY OF THE INVENTION

The underlying idea of the invention is to form subsequences from an image signal sequence, or sequence of frames, outputted by the camera or its imager chip, and to control those subsequences separately. The sequence of frames is outputted with different camera settings or camera parameters, preferably alternatingly or modulo the number of subsequences, so that, for example, each even-numbered frame is adjusted with a first control action and each odd-numbered frame with a second control action. According to the present invention, therefore, the sequence of frames (constituting subsequences) that are outputted e.g. by an HDR camera are controlled differently; the subsequences are evaluated in part, and the camera parameters are then adjusted. The control actions preferably operate entirely separately from one another, with different control objectives.

According to an embodiment of the present invention, it is possible in this context to use one shared controller for the multiple control actions, i.e. a multimodal control system. A bimodal control system can be implemented in particular to control two subsequences, and a trimodal control system to control three subsequences. In accordance with an embodiment alternative to this, control actions having two separately acting controllers, which act in synchronized fashion on the different frames, are also possible. Here each controller controls independently with its own control objectives, e.g. two controllers in dual mode or three controllers in triple mode.

Furthermore, according to a preferred embodiment, the quality of the functions carried out with the image signals is appraised. According to the present invention, here as well more functions can also be provided as subsequences or control actions; this is advantageous in particular with MPC systems. Provision can be made here according to the present invention that the functions, or their function modules, output to the control actions a signal regarding their status or the quality of their status or the quality of their output signals. The control actions receive the output signals and utilize them in order to set the camera parameters. Consideration can be given here, in particular, to instances when a function module indicates very poor quality or performance. One or more control actions can then correspondingly modify the camera parameters, e.g. make the integration time shorter or longer, so that the quality of the relevant function is improved.

The function modules can be embodied, in particular, as software modules that, via a suitable software interface, introduce an input into the control algorithm, e.g. a calculated quality indicator of the function. This parameter transfer can also be, for example, the control window that is to be used for the specific function for frame-synchronous camera control. The function can thus obtain suitable exposure of the scene in the image region that it is presently observing.

The function module can also be provided in a different control device, or for a different computer, than the controller or controllers, and can intervene in the camera control action via a suitable data connection.

Also provided according to the present invention are a computer, program or computer program product for carrying out the method according to the present invention on a computer, in particular also a data medium to which such a computer program has been written or which stores said program.

DETAILED DESCRIPTION OF THE INVENTION

Figure 5:
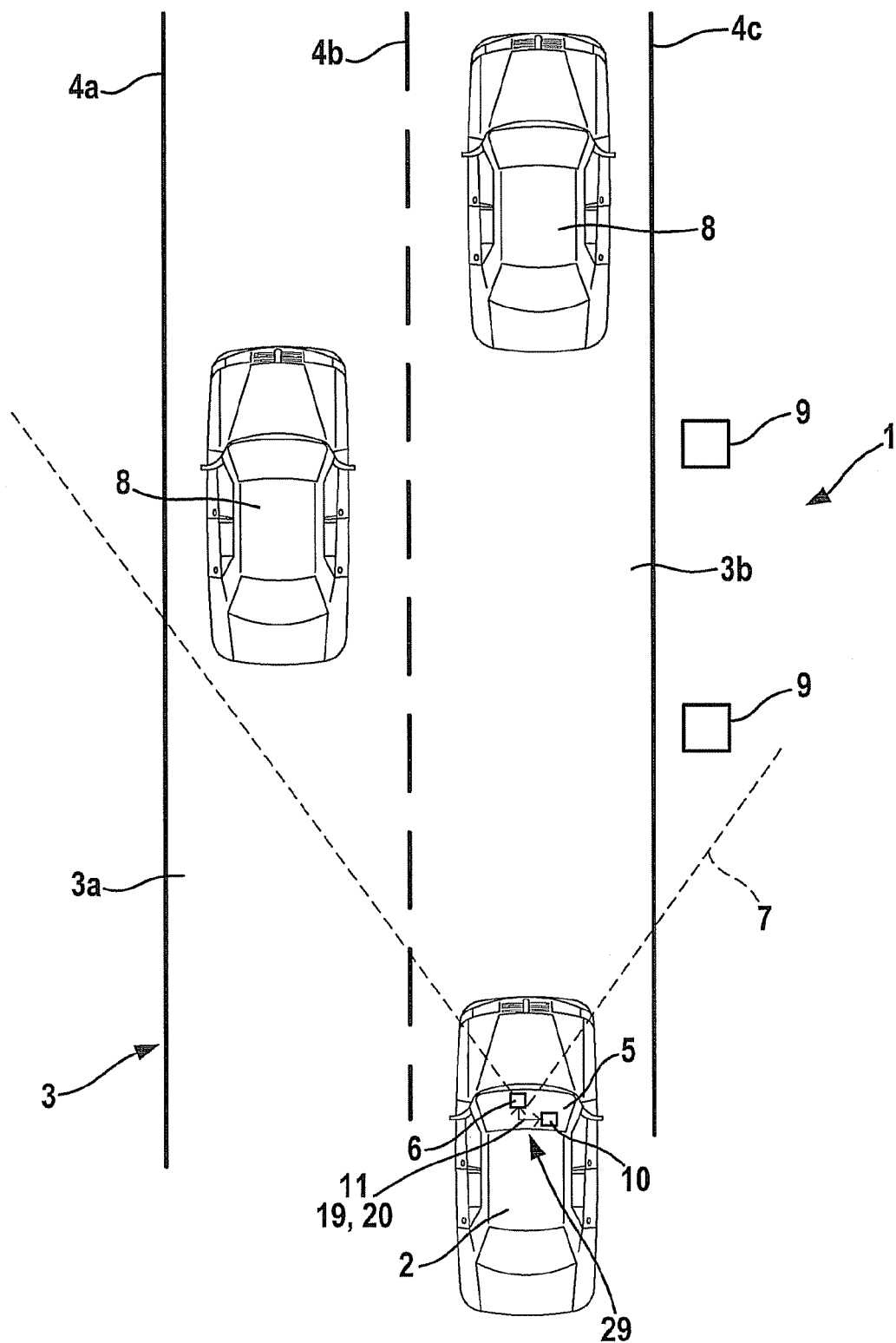
FIG. 5 shows a street scene with a vehicle having the camera assemblage.

FIG. 5 shows a street scene 1 in which a vehicle 2 is driving on a street 3 having, for example, lanes 3a and 3b that are delimited by lane markings 4a, 4b, 4c that are embodied as solid or dashed lines. Vehicle 2 has, for example behind its windshield 5, a camera 6 in whose sensing region 7 are located at least a portion of lanes 3a, 3b and lane markings 4a, 4b, 4c, of further vehicles 8, and of road signs 9 disposed on or next to road 3. Camera 6 outputs image signals 11 to a control device 10; a CMOS or CCD chip, which in known fashion sequentially outputs image signals 11 as frames F1, F2, F3 . . . , serves in particular as camera 6 or as part of camera 6. Camera 6 and control device 10 constitute a camera assemblage 29 that is provided in vehicle 2.

Figure 1:
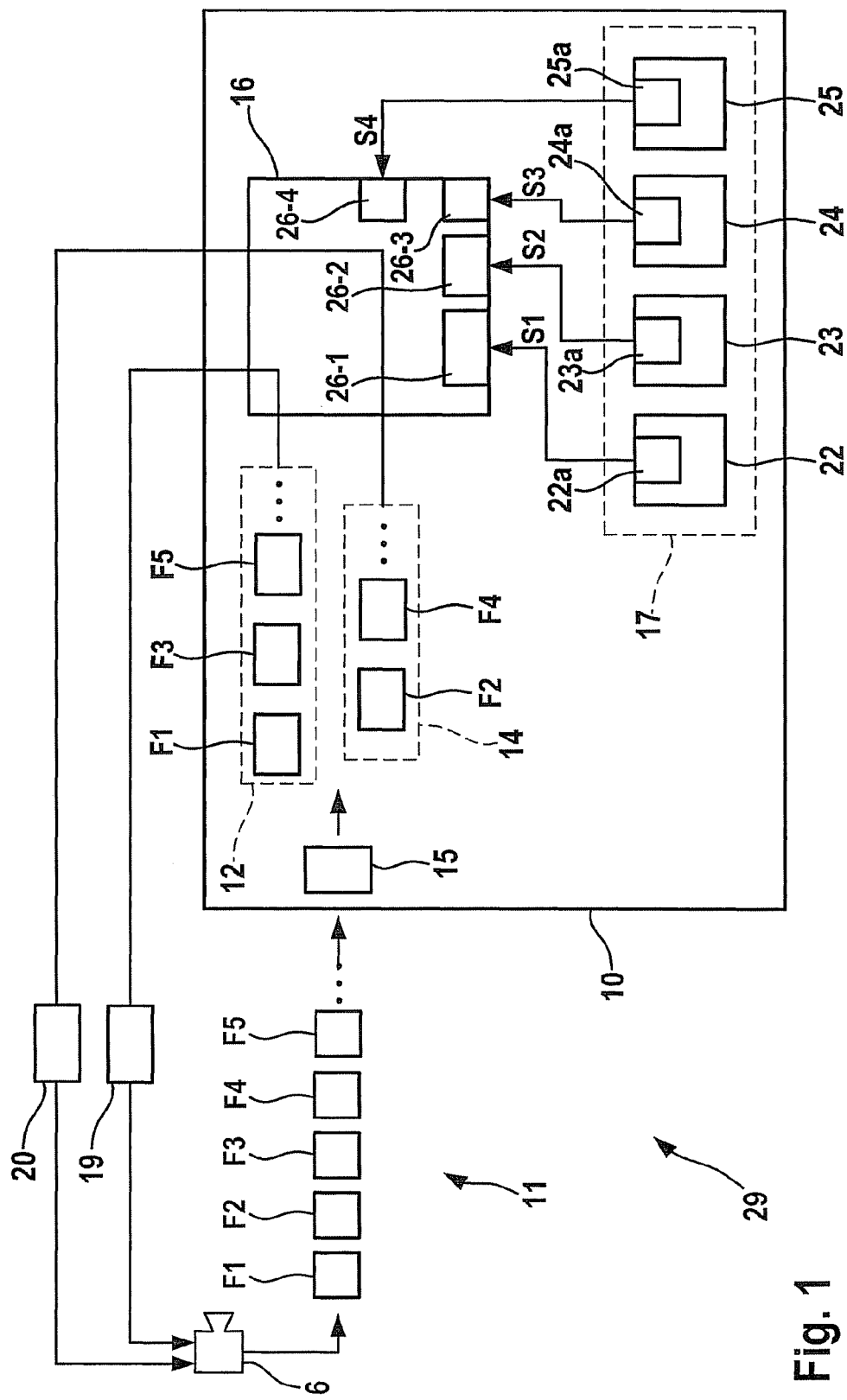
FIG. 1 is a block diagram of a camera assemblage according to an embodiment of the invention, having a bimodal control system and four function modules.

In accordance with the embodiment shown in FIG. 1, image signals 11 are outputted as a sequence of frames F1, F2, F3, F4, F5 . . . , i.e. Fi where i=1, 2, 3, . . . , which are read out sequentially by camera 6.

According to the present invention, subsequences are formed from the sequence of frames Fi. In the embodiment of FIG. 1 with a bimodal control system, a first subsequence 12 of frames F1, F3, F5, . . . , i.e. the frames having an odd number i, and a second subsequence 14 of frames F2, F4, . . . , i.e. the frames having an even number i, are formed in a subdivision device 15 of control device 10. The frames of the two subsequences 12, 14 thus alternate, so that each subsequence always contains every second frame, or only the even or odd frames. The subdivision device can be embodied entirely in software. Separate control actions are carried out on the two subsequences 12, 14. In the bimodal embodiment of FIG. 1, a shared controller 16 is provided which performs both control actions and then outputs or sets camera parameters 19, 20 with which camera 6 is set. Controller 16 is defined, in a manner known per se, by a control algorithm that is embodied as software in control device 10. It evaluates frames Fi, for example, by way of a histogram or an analysis, such that for example an ambient light brightness, contrast, average, median, moments, and percentiles, e.g. of the grayscale values, are determined and appraised; from these are determined camera parameters 19, 20 that set, in particular, the integration time and also, for example, the offset and electrical amplification (gain) of the camera or its pixels. The aperture, black level and shape of the exposure sensitivity characteristic curve can additionally be used.

Camera parameters 19 serve in this context to set the frames for first subsequence 12, i.e. odd-numbered frames F1, F3, F5; and second camera parameters 20 serve correspondingly to set frames F2, F4, . . . of second subsequence 14. Camera 6 is thus set alternatingly in accordance with camera parameters 19 and 20.

Controller 16 possesses different control objectives for the two control actions. The objectives are defined by predetermined functions that are indicated as function modules 22, 23, 24, 25, in particular software function modules 22, 23, 24, 25. They can be implemented, for example, in a memory device 17 as a program. Function modules of this kind can be, in particular, lane detection 22, road sign detection 23, light assistant 24, and trajectory calculation or moving object detection (MOD) 25, which are stored as software modules in the software of control device 10 in a manner known per se, each function module 22, 23, 24, 25 operating from [sic: ?on] frames Fi, i=1, 2, . . . . If only two function modules 22, 23 are provided, a control action and a control objective can be allocated to each function module 22, 23 so that, for example, lane detection 22 operates on first subsequence 12. Because lane detection is to be carried out, for the detection of road markings 4a, 4b, 4c in FIG. 5, also in particular over greater distances from vehicle 2, and because a higher intensity is thus advantageous, no limitations are provided here, for example, on integration time; a lower image region is relevant. The function module for road sign detection 23 tends to require fairly short integration times (e.g. up to a maximum of 15 ms) in order to differentiate different road signs 9, so that sharp contours are sensed; short integration times are thus desirable in the control action for second subsequence 14, external lateral image regions being relevant. Camera parameters 19, 20 are thereby distinguished in general terms. In a simple embodiment of this kind having only two function modules 22, 23, the control objectives can be incorporated directly into the camera control algorithm, and a respective quality objective can be achieved in frame-synchronized fashion in subsequences 12, 14. Acquisition of the image data is shown for the sake of clarity in FIG. 1a, indicating that function module 22 receives the frames of first subsequence 12 and function module 23 the frames of second subsequence 14; and function modules 22, 23 output, in accordance with their evaluation or assessment of the image data, output signals S5, S6, for example for display to the driver and/or for a vehicle intervention.

Figure 1A:
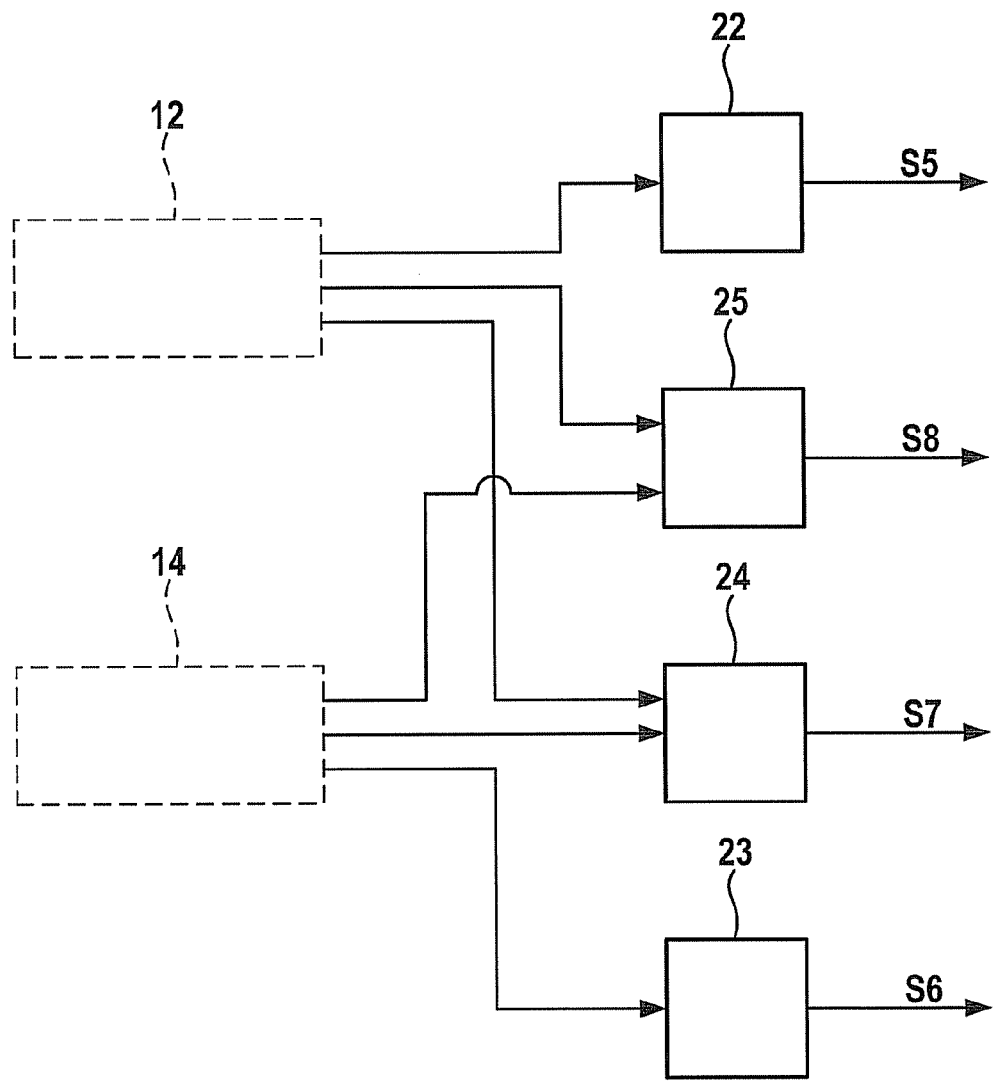
FIG. 1a shows further details of the camera assemblage, to supplement FIG. 1.

In the embodiment shown in FIG. 1, however, two further function modules 24, 25 are shown which correspondingly pursue further or overlapping objectives. The function module of the light assistant 24 is designed to detect other road users 8 even at greater distances, so as to switch off the high beams as applicable. Longer integration times are therefore advantageous here. In the case of the function module for moving object detection 25, provision is made for detecting structures even in dark areas, although sufficiently accurate contour acquisition is also useful in order to calculate the trajectory of the moving objects. Function modules 22, 23, 24, 25 as shown in FIG. 1a can therefore essentially each access two subsequences 12, 14. They can thereby examine, for example, different image regions of frames Fi, i=1, 2, 3, . . . in which relevant contours are expected. They correspondingly output output signals S7, S8, for example as an indication to the driver or also for automatic vehicle intervention, e.g. dimming the high beams. According to the present invention, a pedestrian detector and/or a night vision system can also be provided as further function modules, instead of or even in addition to the function modules recited here.

According to the present invention, function modules 22, 23, 24, 25 output status signals S1, S2, S3, S4 to controller 16 or to its control algorithm, which signals the latter correspondingly takes into account when setting camera parameters 19, 20. For this purpose, in particular, one or more software interfaces 26-1, 26-2, 26-3, 26-3 [sic: ?26-4] can be implemented in the control algorithm of controller 16, and one or more software interfaces 22a, 23a, 24a, 25a in function modules 22, 23, 24, 25. Status signals S1, S2, S3, S4 can contain, in particular, a quality assessment which contains an assessment of its own status and/or of the quality of its output signals S5, S6, S7, S8. They can thus be, for example, merely a simple scalar value between a minimum and a maximum, although they can also contain more complex data.

Controller 16 takes in account particularly whether a status signal S1 to S4 assumes a very poor value, so that the control objective of one or both subsequences 12, 14 can be modified, if applicable, in order to improve that functional objective and, if applicable, to limit the functional objective of one of the other function modules that is better in terms of its status signal. Criteria for the consideration of status signals S1 to S4 can be defined in this context in controller 16. In particular, priorities can be set so that one of the function modules can operate preferentially. In addition, for example, lower limit values can be defined for status signals S1 to S4, such that if they fall below said limits, an effort is made to improve that function module.

According to the present invention, function modules 22, 23, 24, 25 can also be provided outside control device 10, data and signal transfer to interfaces 26-1, 26-2, 26-3, 26-4 then taking place over a suitable data connection.

Figure 2:
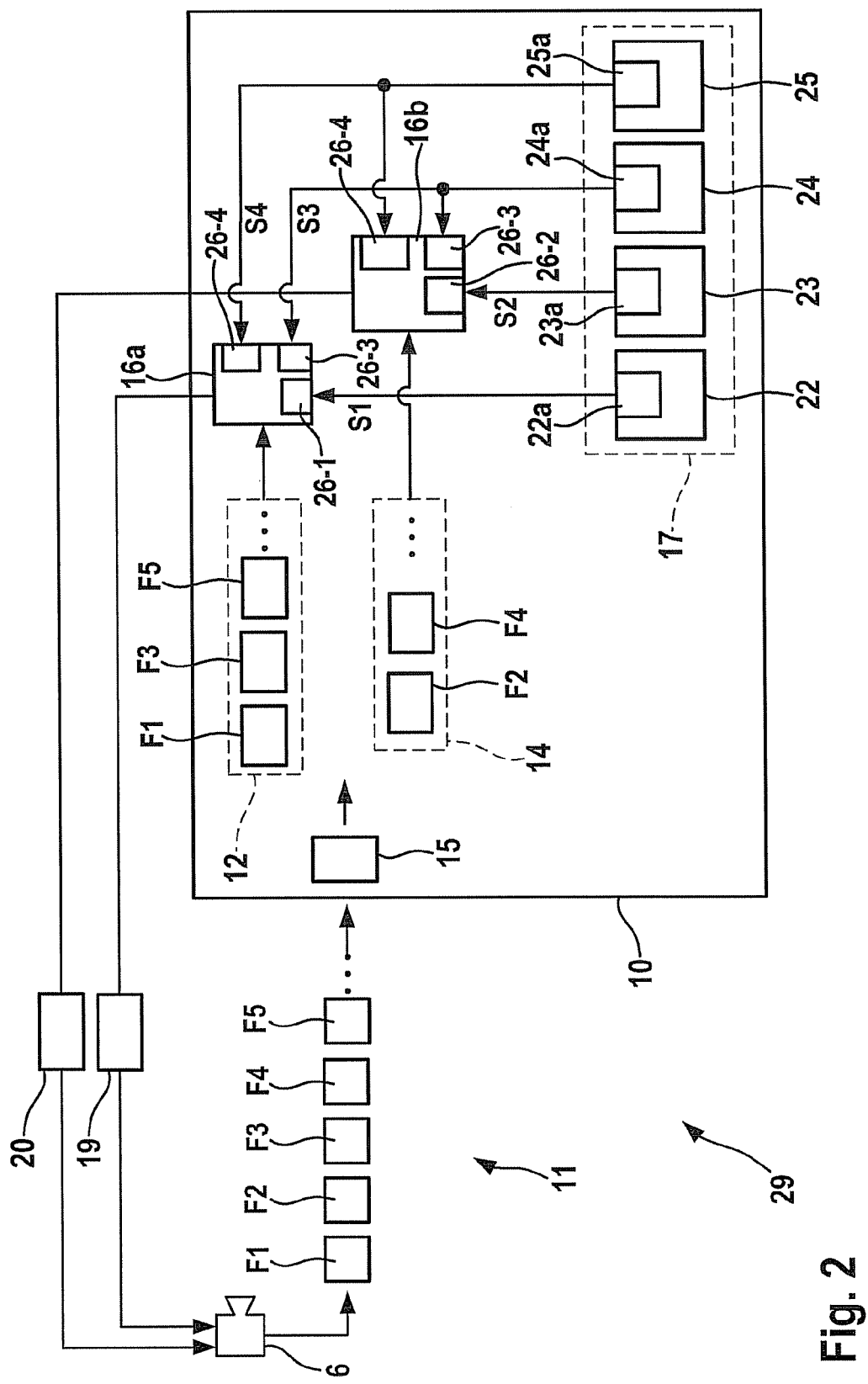
FIG. 2 shows a camera assemblage according to a further embodiment, with dual-mode control.

FIG. 2 shows a further embodiment with dual mode control, in which instead of controller 16 of FIG. 1, two controllers 16a, 16b are provided for the two control actions. In this case status signals S1 to S4 can be outputted entirely or partly to both controllers 16a, 16b. Provision is made according to FIG. 2, for example, that light assistant 24 and moving object detector 25 output their status signals S3 and S4 to both controllers 16a, 16b. Controllers 16a, 16b thus each operate independently, and in particular can represent different control algorithms or can even be embodied in hardware terms as different controllers. Function modules 22, 23, 24, 25 can also output different status signals to the different controllers 16a, 16b if the criteria relevant for controllers 16a, 16b are different.

Fig. shows a corresponding subdivision of image signals 11 in a trimodal control system having three subsequences 12, 13, 14 and one shared controller 16, camera parameters 21 here being outputted in correspondingly supplemental fashion to camera 6, which thus sets three successive frames each in different fashion.

Figure 3:
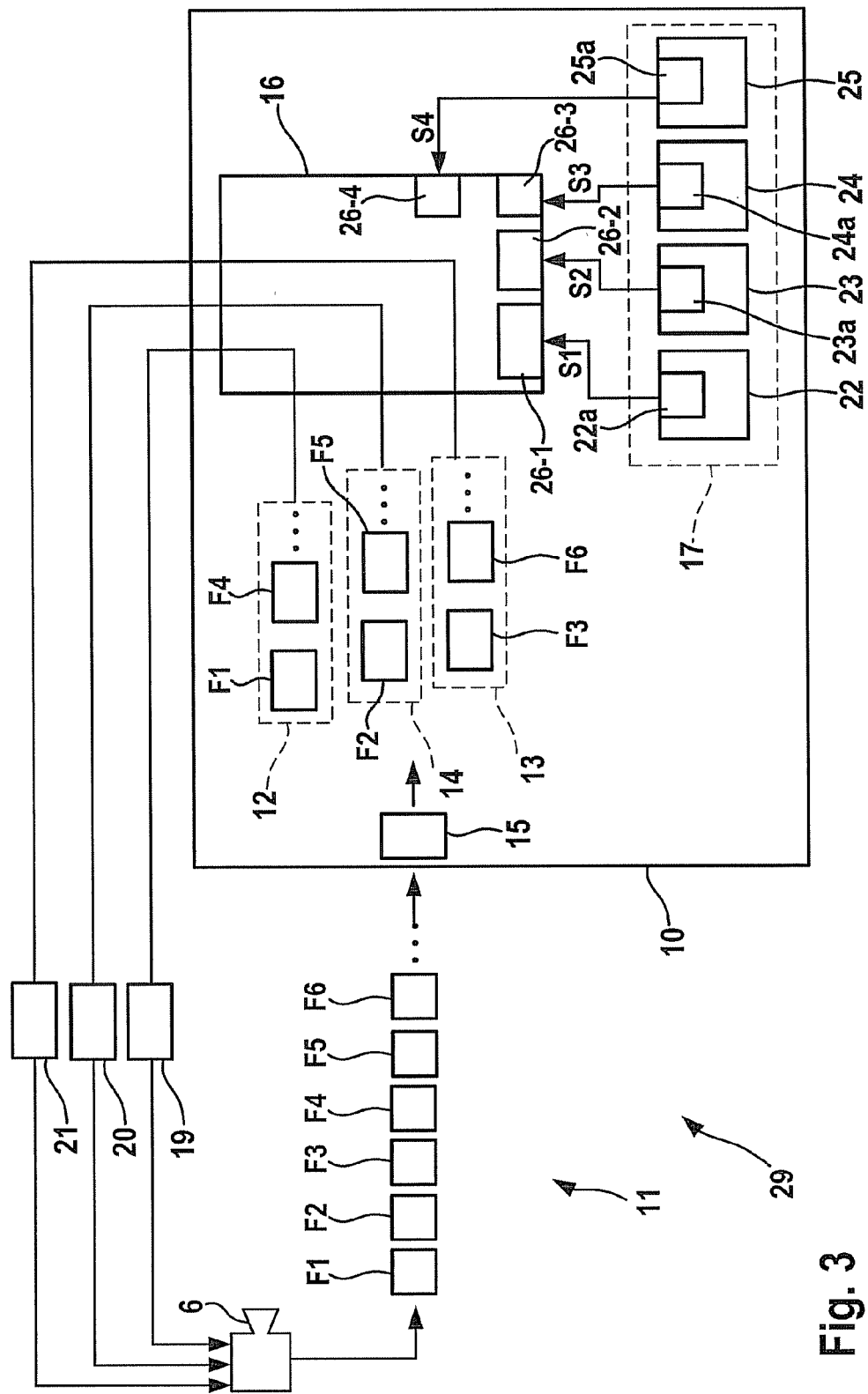
FIG. 3 shows a camera assemblage according to a further embodiment, with a trimodal control system.

In an embodiment (not shown) with triple-mode control, three separate controllers are used, with which three subsequences 12, 13, 14 are controlled in accordance with FIG. 3.

Figure 4:
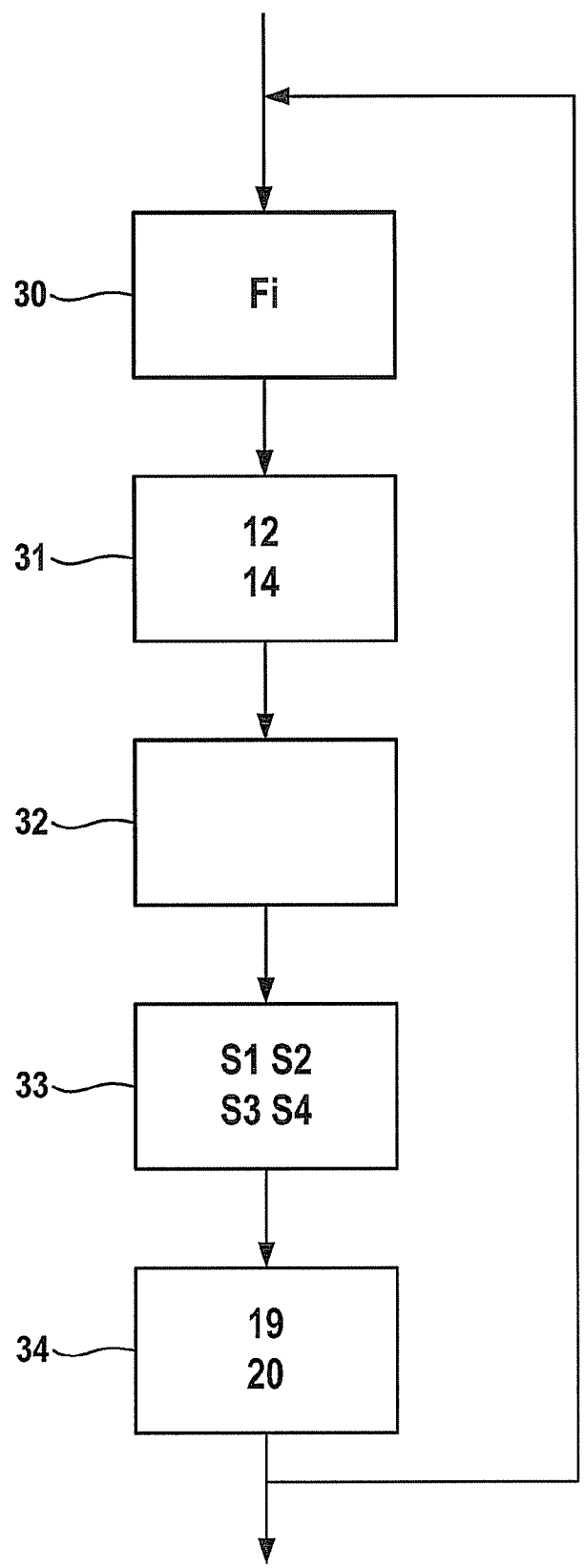
FIG. 4 is a flow chart of a method according to the present invention.

In accordance with the method according to the present invention of FIG. 4, in the control loops in step 30, images are acquired by camera 6 and image signals 11 are outputted as a sequence of frames Fi that are then, in step 31, subdivided into two or more subsequences 12 and 14 or 12, 13, 14. This is followed in step 32 by evaluation of subsequences 12, 14 or 12, 13, 14 by function modules 22, 23, 24, 25. In step 33, status signals S1, S2, S3, S4 are outputted. In step 34, output of control parameters 19, 20 or 19, 20, 21 is performed by controller 16 or controllers 16a, 16b, taking into account status signals S1 to S4.

What is claimed is:

1. A control device for a camera assemblage, the control device comprising:
   at least one controller for reception of image signals of a camera and for outputting or setting of camera parameters for the camera, the image signals comprising a sequence of frames;
   wherein:
      the control device subdivides the sequence of frames into at least two subsequences;
      the at least one controller controls the subsequences separately, and outputs different camera parameters for controlling the subsequences;
      at least one of: (a) the at least one controller includes interfaces for internal function modules or for external function modules for reception and evaluation of the frames or of the subsequences, and (b) the control device further comprises the internal function modules for the reception and evaluation of the frames or of the subsequences;
      the at least one controller or an evaluation device connected to the controller receives, from the function modules, status signals regarding a status of the function modules or a status or quality of their output signals;
      the at least one controller:
         takes into account at least one of the status signals in at least one control action; and
         in the case in which a status signal of a first function module indicates a poor status of the first function module or a poor status or poor quality of its output signal, and a status signal of a second function module indicates a better status of the second function module or a better status or better quality of its output signals, modifies at least one of the control actions in such a way that the status of the first function module or the status or quality of its output signal is improved;
      priorities are allocated to the function modules; and
      the control device reacts to the status signals of the function modules in accordance with their priority.

* * * * *